US012596784B2

(12) United States Patent
Song et al.

(10) Patent No.: US 12,596,784 B2
(45) Date of Patent: Apr. 7, 2026

(54) DYNAMIC UPDATE SYSTEM AND DYNAMIC UPDATE METHOD

(71) Applicant: Samsung Electronics Co., Ltd.,
Suwon-si (KR)

(72) Inventors: Moonkyu Song, Suwon-si (KR);
Hanhui Li, Suwon-si (KR); Jiangbo Chen, Suwon-si (KR); Yongjoo Kwon, Suwon-si (KR); Joohwan Kim, Suwon-si (KR); Junseo Lee, Suwon-si (KR); Jieun Jang, Suwon-si (KR); Hanju Je, Suwon-si (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 124 days.

(21) Appl. No.: 18/351,256

(22) Filed: Jul. 12, 2023

(65) Prior Publication Data

US 2024/0346128 A1 Oct. 17, 2024

(30) Foreign Application Priority Data

Apr. 14, 2023 (CN) .......................... 202310404652.0

(51) Int. Cl.
*G06F 21/32* (2013.01)
*G06F 21/45* (2013.01)
(52) U.S. Cl.
CPC .............. *G06F 21/45* (2013.01); *G06F 21/32* (2013.01)
(58) Field of Classification Search
None
See application file for complete search history.

(56) References Cited

U.S. PATENT DOCUMENTS

| | | | |
|---|---|---|---|
| 7,266,224 B2 | 9/2007 | Sukegawa | |
| 10,289,821 B2 | 5/2019 | Kim et al. | |
| 10,503,992 B2 | 12/2019 | Mostafa et al. | |
| 10,678,896 B2 | 6/2020 | Kim et al. | |
| 10,878,262 B2 | 12/2020 | Oh et al. | |
| 11,341,221 B2 | 5/2022 | Sim et al. | |
| 2010/0060411 A1* | 3/2010 | Ikegami | G06V 40/50 340/5.53 |
| 2014/0003681 A1* | 1/2014 | Wright | G06V 40/1335 382/124 |
| 2017/0220848 A1* | 8/2017 | Clausen | G06F 18/22 |
| 2019/0018942 A1* | 1/2019 | Takada | G06V 40/50 |
| 2019/0042866 A1* | 2/2019 | Mostafa | G06V 40/171 |
| 2020/0065598 A1* | 2/2020 | Oh | G02B 1/11 |

FOREIGN PATENT DOCUMENTS

| | | |
|---|---|---|
| KR | 10-0550739 B1 | 2/2006 |
| KR | 10-2021736 B1 | 9/2019 |
| KR | 102238688 B1 | 4/2021 |
| KR | 10-2386918 B1 | 4/2022 |

* cited by examiner

*Primary Examiner* — Nelson S. Giddins
(74) *Attorney, Agent, or Firm* — Harness, Dickey & Pierce, P.L.C.

(57) ABSTRACT

A dynamic update system includes an input unit configured to receive biometric information of a user in real time and convert the biometric information into biometric data, a dynamic update processing unit configured to use the biometric data for dynamic update, and a storage configured to back up registered biometric data of the user and data for the dynamic update, wherein the dynamic update processing unit determines whether to perform the dynamic update using the biometric data by utilizing one of spatial information and time information of the biometric data.

18 Claims, 11 Drawing Sheets

FIG. 5

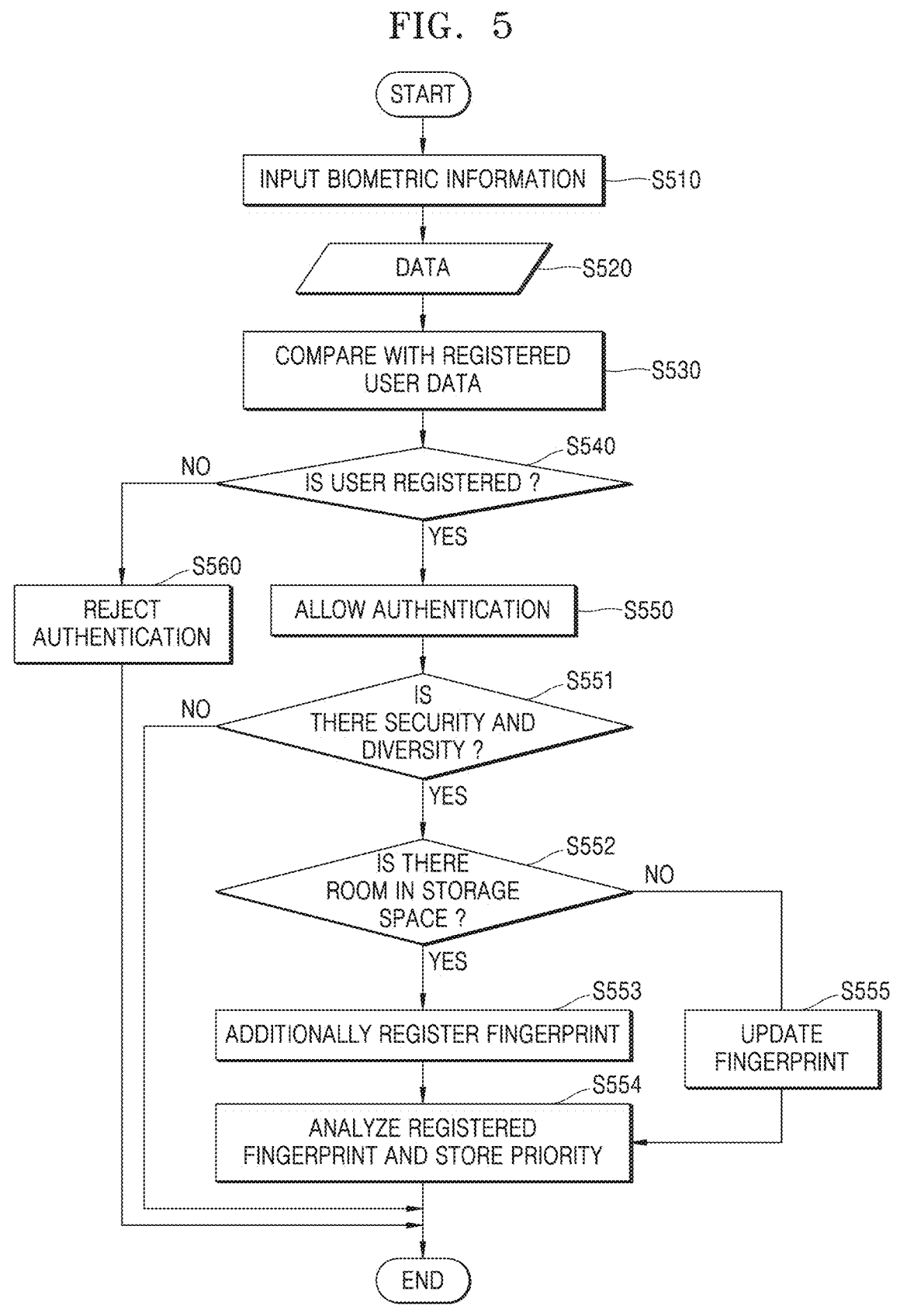

```
                        ( START )
                            │
                            ▼
              ┌──────────────────────────────┐
              │  INPUT BIOMETRIC INFORMATION  │──── S510
              └──────────────────────────────┘
                            │
                            ▼
                  ╱──────────────────╲
                 ╱        DATA         ╲──── S520
                 ╲                    ╱
                  ╲──────────────────╱
                            │
                            ▼
              ┌──────────────────────────────┐
              │     COMPARE WITH REGISTERED   │──── S530
              │           USER DATA           │
              └──────────────────────────────┘
                            │
            NO              ▼           S540
       ◄────────── ◇ IS USER REGISTERED ? ◇
       │                    │
       │                   YES
       ▼                    ▼
  ┌─────────────┐    ┌────────────────────────┐
  │   REJECT    │    │   ALLOW AUTHENTICATION  │──── S550
  │AUTHENTICATION│   └────────────────────────┘
  └─────────────┘              │
    S560          NO           ▼        S551
       ◄────────── ◇  IS THERE SECURITY AND  ◇
       │                    DIVERSITY ?
       │                    │
       │                   YES
       │                    ▼
       │          ◇  IS THERE ROOM IN STORAGE  ◇  NO    S552
       │          ◇        SPACE ?             ◇ ────────┐
       │                    │                            │
       │                   YES                           │
       │                    ▼          S553              ▼        S555
       │    ┌──────────────────────────────────┐   ┌──────────┐
       │    │ ADDITIONALLY REGISTER FINGERPRINT │   │  UPDATE  │
       │    └──────────────────────────────────┘   │FINGERPRINT│
       │                    │          S554         └──────────┘
       │    ┌──────────────────────────────────┐        │
       │    │       ANALYZE REGISTERED          │◄───────┘
       │    │ FINGERPRINT AND STORE PRIORITY    │
       │    └──────────────────────────────────┘
       │                    │
       └────────────────────┤
                            ▼
                        ( END )
```

FIG. 7A
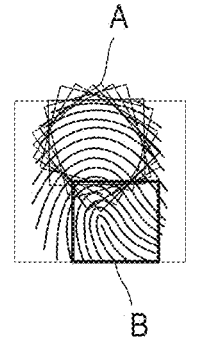
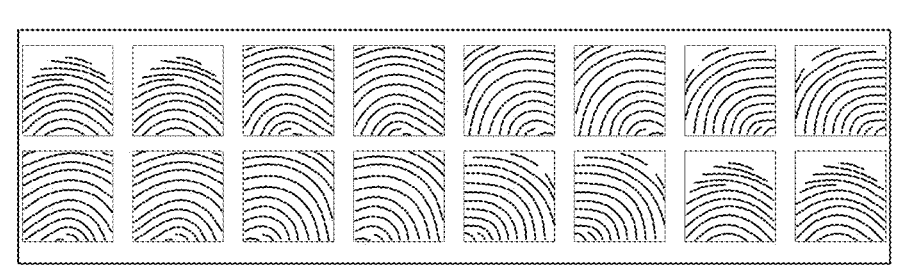
FIG. 7B
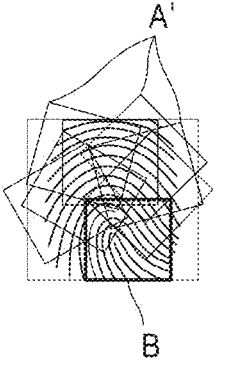
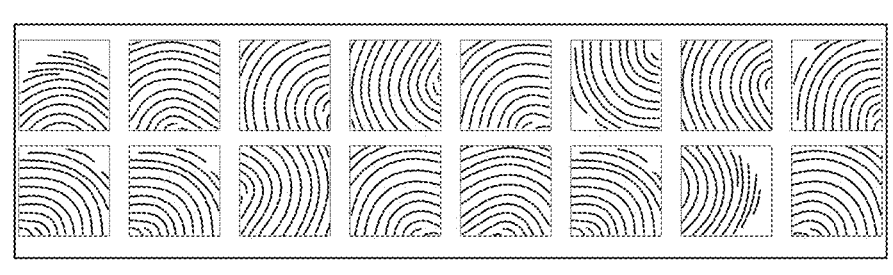

| Match events | 1st | 2nd | 3rd | 4th | 5th | 6th | 7th | 8th | 9th | 10th | 11th | 12th | 13th | 14th | 15th |
|---|---|---|---|---|---|---|---|---|---|---|---|---|---|---|---|
| Match result P: pass; F:fail | P | P | F | P | F | P | P | P | P | P | P | P | P | P | F |

DYNAMIC UPDATE SYSTEM AND DYNAMIC UPDATE METHOD

CROSS-REFERENCE TO RELATED APPLICATION

This application claims priority under 35 U.S.C. § 119 to Chinese Patent Application No. 202310404652.0, filed on Apr. 14, 2023, in the China National Intellectual Property Administration, the disclosure of which is incorporated by reference herein in its entirety.

BACKGROUND

The inventive concepts relate to a dynamic update system and a dynamic update method.

Currently, biometric information used by a biometric authentication system includes the face, voice, fingerprint, iris, vein, and so on, and biometric authentication technology for each type of biometric information is actively developed. Among various biometric authentication technologies, technology using face recognition or fingerprint recognition is widely used to increase convenience of use and authentication speed.

A biometric method using user-specific biometric information requires update of biometric information as a user's biometric state changes. In this case, when biometric information other than a user is registered to update a user's biometric information, security is weakened. In addition, when updating a user's biometric information, information that overlaps previously registered biometric information reduces the efficiency of authentication.

SUMMARY

The inventive concepts provide a dynamic update system and a dynamic update method that have security, diversity, and stability.

A dynamic update system according to an example embodiment of the inventive concepts is disclosed.

The dynamic update system includes an input unit configured to receive biometric information of a user in real time and convert the biometric information into biometric data, a dynamic update processing unit configured to use the biometric data for dynamic update, and a storage configured to back up registered biometric data of the user and data for the dynamic update, wherein the dynamic update processing unit determines whether to perform the dynamic update using the biometric data by utilizing one of spatial information and time information of the biometric data.

A dynamic update method according to another example embodiment of the inventive concepts is disclosed.

The dynamic update method includes receiving a user's biometric information and converting the biometric information into biometric data, determining whether the biometric data matches registered user data, determining whether to perform dynamic update considering one of spatial information and time information when the biometric data matches the registered user data, and performing dynamic update according to a result of determining whether the dynamic update is performed.

A dynamic update system according to another example embodiment of the inventive concepts is disclosed.

The dynamic update system includes an input unit configured to receive biometric information of a user in real time and convert the biometric information into biometric data, a dynamic update processing unit configured to use the biometric data for dynamic update, and a buffer unit configured to back up data for the dynamic update, wherein the dynamic update processing unit determines whether to perform the dynamic update using the biometric data by utilizing one of spatial information and time information and performs update, and the buffer unit temporarily stores the biometric data used for the dynamic update.

BRIEF DESCRIPTION OF THE DRAWINGS

Example embodiments will be more clearly understood from the following detailed description taken in conjunction with the accompanying drawings in which:

FIG. 5 is a flowchart illustrating an operating method of a dynamic update system, according to an example embodiment of the inventive concepts;

FIGS. 7A to 7C are views illustrating dynamic update in which spatial information is considered, according to some example embodiments of the inventive concepts;

FIG. 8 is a diagram illustrating dynamic update in which time information is considered, according to an example embodiment of the inventive concepts;

DETAILED DESCRIPTION OF THE EXAMPLE EMBODIMENTS

Hereinafter, various example embodiments of the inventive concepts will be described with reference to the accompanying drawings.

Figure 1:
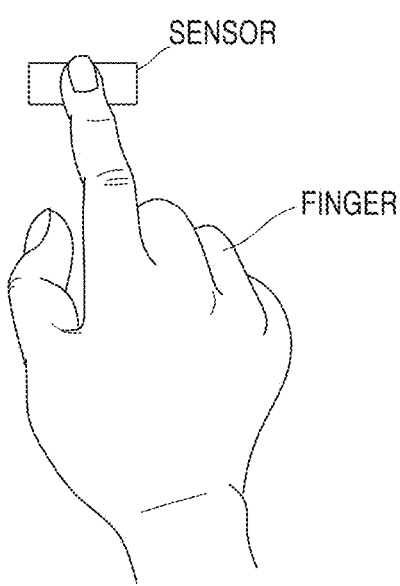
FIG. 1 is a view illustrating an operation of acquiring input data including biometric data, according to an example embodiment of the inventive concepts.

FIG. 1 is a view illustrating an operation of acquiring input data including biometric information, according to an example embodiment. Hereinafter, it is assumed that biometric information of a user to be input is a fingerprint, for the sake of convenience of description. However, the example embodiments may be applied in the same way to various types of biometric information that may be recognized in the form of images, such as veins and irises.

Referring to FIG. 1, a sensor according to an example embodiment may detect a user's fingerprint. For example, the sensor may include a plurality of sensing elements. The plurality of sensing elements may be arranged in an array or a matrix structure. The sensor may detect a fingerprint input in the form of an analog signal by using a plurality of sensing elements. The sensor may convert a detected analog signal into a digital image by using an analog-to-digital converter. In the inventive concepts, biometric data may indicate digital data obtained by converting biometric information of a user detected by a sensor into data.

In this case, a size of the sensor may be different from a size of a user's finger. For example, when the sensor is mounted on a mobile terminal, the size of the sensor may be less than the size of a user's finger to satisfy constraint conditions of a form factor of a mobile terminal. In this case, the sensor may detect only a part of the fingerprint of the user's finger. Hereinafter, input data detected by a sensor may be partial data of a user's fingerprint.

Sensor specifications may be different for each sensor manufacturer, and the sensor specifications may each include a size of a sensor array, a resolution of the sensor, and so on. The size of the sensor array may indicate a size of a sensing area formed by a plurality of sensing elements. For example, the sensor array may have a size of 1 cm (length)×3 cm (width). The resolution of the sensor may indicate the number of sensing elements per unit length or unit area. Although sizes of sensor arrays are the same as each other, when the resolution of the sensor is high, the sensor may include more sensing elements. For example, the resolution of the sensor may be 56 pixels (length)×144 pixels (width).

In the inventive concepts, a dynamic update method for improving performance of an authentication method using biometric data and enhancing user convenience is described. In a biometric data authentication process which is classified into a registration process and an authentication process, registration is made together with the authentication process, and thus, authentication performance may be improved without inconvenience of a user's registration process.

Figure 2:
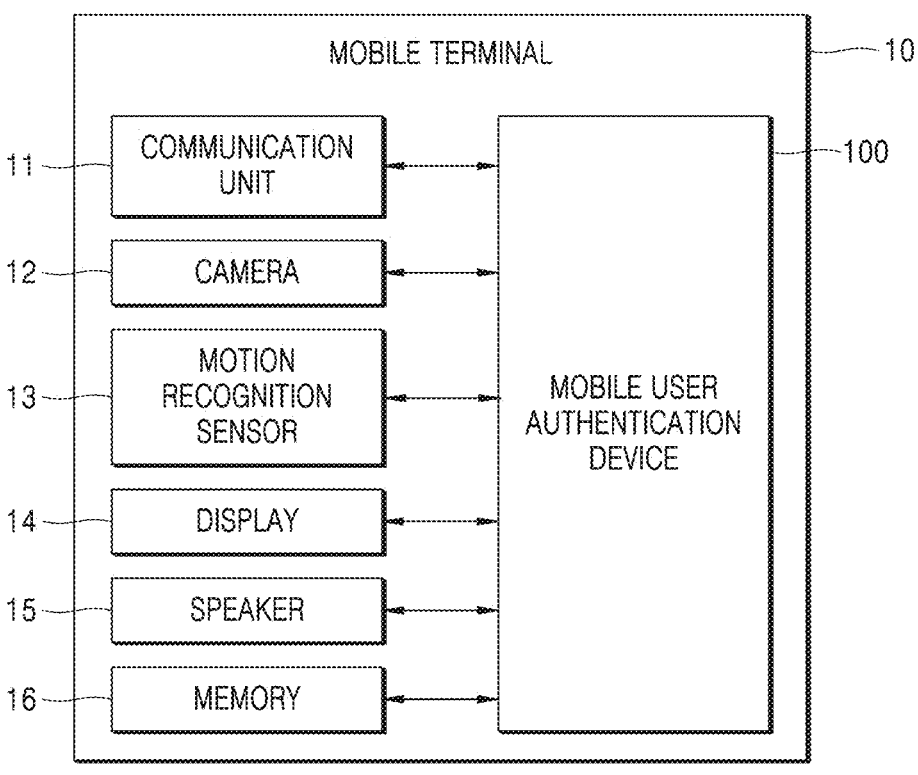
FIG. 2 is a block diagram of a mobile terminal according to an example embodiment of the inventive concepts.

FIG. 2 illustrates a mobile terminal according to an example embodiment of the inventive concepts.

As illustrated in FIG. 2, a mobile terminal 10 to which inventive concepts are applied may include a communication unit 11 performing data communication or voice communication, a camera 12 generating a digital image by taking a picture, a motion recognition sensor 13 for recognizing a motion or a position of the mobile terminal 10, a display 14 for outputting visual information, a speaker 15 for outputting sound, a memory 16 storing data, and so on. In this case, the motion recognition sensor 13 of the mobile terminal 10 may be composed of a composite sensor that selectively includes two or more of a gyro, an acceleration sensor, a geomagnetic sensor, and an altimeter. A mobile user authentication device 100 based on artificial intelligence (AI) according to the inventive concepts may be installed in the mobile terminal 10 to interwork with the mobile terminal 10 and to authenticate a user of the mobile terminal 10.

To this end, the mobile user authentication device 100 may be implemented in the form of a system on chip (SoC) built in the mobile terminal 10 or implemented as a processor of the mobile terminal 10 and an application program executed by the processor. In addition, the mobile user authentication device 100 may also be implemented in the form of a dongle connected to an input terminal of the mobile terminal 10.

The mobile user authentication device 100 according to an example embodiment of the inventive concepts may also be a mobile user authentication device provided for a card payment. The mobile user authentication device 100 may include a sensor for recognizing biometric data. According to one example, the mobile user authentication device 100 may include the sensor illustrated in FIG. 1.

Figure 3:
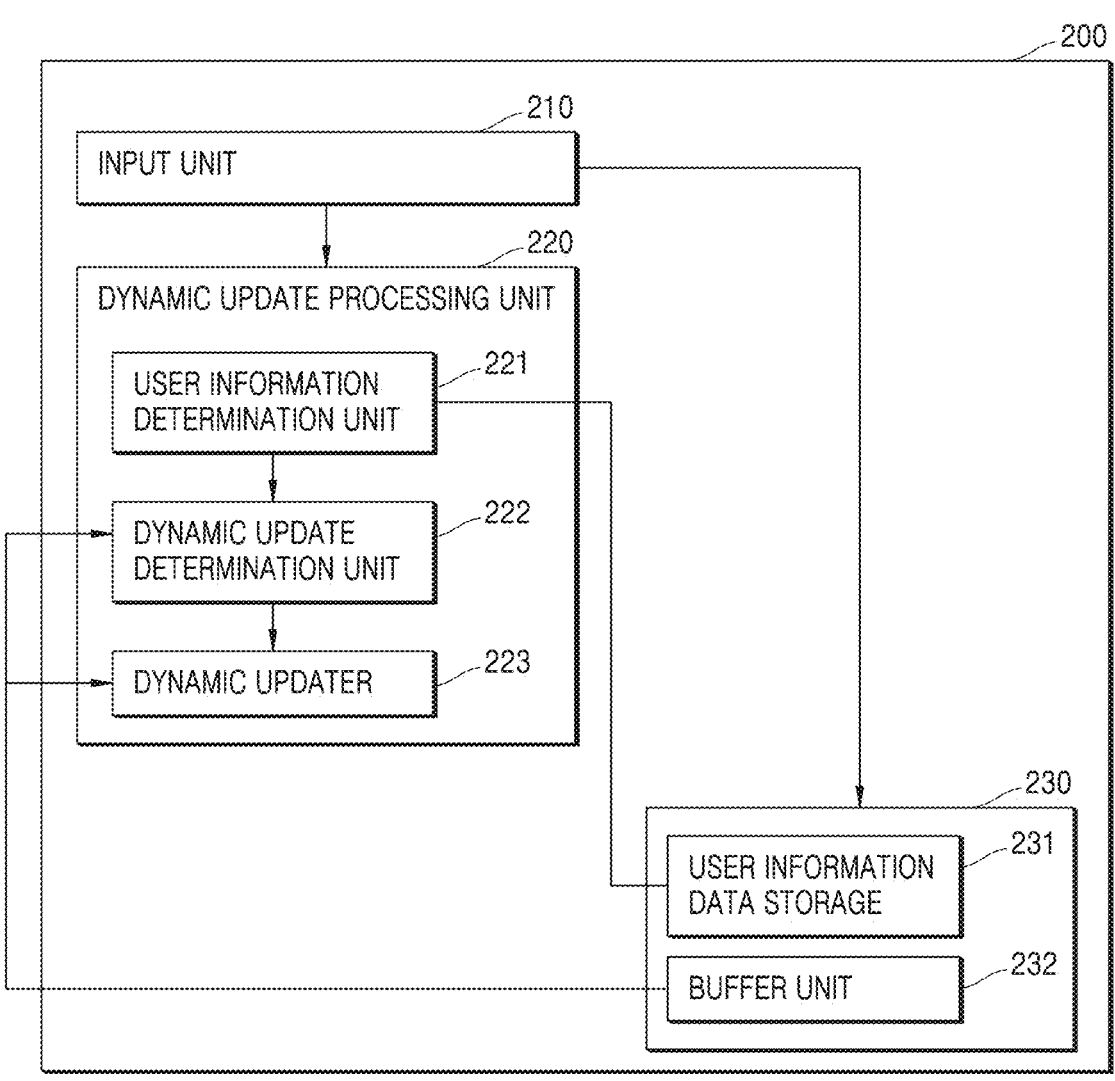
FIG. 3 is a block diagram illustrating a dynamic update system according to an example embodiment of the inventive concepts.

FIG. 3 is a block diagram illustrating a dynamic update system according to an example embodiment of the inventive concepts. According to one example, a dynamic update system 200 of FIG. 3 may be included in or correspond to the mobile user authentication device 100 of FIG. 2. According to one example, the mobile terminal 10 of FIG. 2 may perform a payment function and may perform authentication and dynamic update for payment by using the mobile user authentication device 100. According to one example, the dynamic update system 200 of FIG. 3 may also be embedded in a credit card or so on for payment rather than the mobile user authentication device 100.

In the inventive concepts, dynamic update may mean that, when a user's biometric data is input for payment or so on, the user's biometric data is not only used for authentication for payment or so on which is the original purpose but also updated to register the corresponding biometric data in addition to previously registered information.

Referring to FIG. 3, the dynamic update system 200 according to the inventive concepts may include an input unit 210, a dynamic update processing unit 220, and a storage 230. The dynamic update processing unit 220 may include a user information determination unit 221, a dynamic update determination unit 222, and a dynamic updater 223. The storage 230 may include a user information data storage 231 and a buffer unit 232. However, the dynamic update system 200 illustrated in FIG. 3 may further include some components. The dynamic update system 200 according to the inventive concepts may update registered user data considering the similarity between biometric data and registered user data, redundancy with data for dynamic update, authentication records, and so on.

The input unit 210 may input biometric measurement information of a user to be recognized. According to one example, the input unit 210 may convert biometric information of a user received from a camera or various sensors into data. The input unit 210 may transmit biometric data generated by data conversion to the dynamic update processing unit 220 and the storage 230. The input unit 210 may include at least one of a key input unit such as a keyboard or a keypad, a touch input unit such as a touch sensor or a touch pad, a sound source input unit, a camera, and various sensors and may also include a gesture input unit. In addition to this, the input unit 210 may include any type of input units that is currently under development or may be developed in the future. According to various example embodiments of the inventive concepts, the input unit 210 may include a fingerprint input unit (not illustrated) that may receive a user's fingerprint detected by at least one sensor provided in the mobile user authentication device 100 of FIG. 2.

In the inventive concepts, data input through the input unit 210 may be used interchangeably with terms, such as "input biometric data" and "biometric data".

The user information data storage 231 may store biometric data of a user to be recognized, whether authentication is successful, and so on. According to one example, the user information data storage 231 may include at least one of an authentication information database storing registered authentication information and a fingerprint information database for cumulatively managing authenticated fingerprint information.

In one example, the biometric data used for the user information determination unit 221 to determine a user may be distinguished from the data to be compared for the dynamic update determination unit 222 to determine the priority of the biometric data. Hereinafter, the biometric data used for the user information determination unit 221 to determine a user may be used interchangeably with "registered user biometric data", "registered user data", "existing registered data", and so on. In order for the dynamic update determination unit 222 to determine the priority of biometric data, data to be compared may be used interchangeably with "data for dynamic update", "previously stored data for registration", "dynamic update data", and so on. The user information data storage 231 may store both the biometric data used for the user information determination unit 221 to determine a user and the data to be compared for the dynamic update determination unit 222 to determine the priority of the biometric data. According to one example, the data for dynamic update may be included in the registered user biometric data. According to one example, data for dynamic update may be selected from the registered user biometric data. In the inventive concepts, for the sake of convenience of description, it is described that the data for dynamic update is distinguished from the registered user biometric data.

When detecting states of the mobile user authentication device 100 and so on and performing update, the buffer unit 232 may restore information such that there is no loss of information when the update fails. According to one example, when power is disconnected during dynamic update using biometric data, only some of the biometric data is stored. The buffer unit 232 may restore and process the existing biometric data. The buffer unit 232 may be connected to the dynamic update determination unit 222 and the dynamic updater 223. The buffer unit 232 may store recognized biometric data until the update is completed and remove the corresponding data when authentication of the recognized biometric data is successful and transfer the biometric data used for the corresponding dynamic update to the dynamic update determination unit 222 and the dynamic updater 223 when the authentication fails due to an error.

According to an example embodiment of the inventive concepts, the mobile user authentication device 100 may use a wireless non-contact method. In this case, power may be supplied wirelessly to perform dynamic update, and thus, power supply may be unstable. In addition, in this case, when a user removes power supply by moving a card during an information update, the dynamic update may be interrupted during update. In this way, when the dynamic update is interrupted, only some of the data to be stored may be stored, and when existing data is removed to efficiently use memory, there is a risk that some data may remain removed. In order to prevent or hinder this, the buffer unit 232 may store data in a separate restorable memory when data is removed or may detect an updated state, and when the update is not completed, the buffer unit 232 may restore the original state when power is supplied next. That is, the dynamic update system 200 may further include a processor and a memory where back up data is stored to prevent or hinder the data from being lost and a history of the data is stored.

According to one example, the storage 230 may temporarily store a program necessary for functional operations according to various example embodiments and various pieces of data generated during execution of the program. The storage 230 may include a program area and a data area. The program area may store information on driving an electronic device, such as an operating system (OS) for booting the electronic device. The data area may store transmitted data, received data, and generated data according to various example embodiments. The user information data storage 231 and the buffer unit 232 described in the inventive concepts may indicate the data areas. In addition, the storage 230 may include at least one storage medium among flash memory, a hard disk, a multimedia card micro type memory (for example, a secure digital (SD) memory or an extreme digital (XD) memory), random access memory (RAM), and read only memory (ROM).

The dynamic update processing unit 220 may set the priority for input biometric data and use the set priority for dynamic update.

The user information determination unit 221 may compare similarities, with each other, between the biometric data input by the input unit 210 and the registered user biometric data stored in the user information data storage 231 and recognize a user based on the obtained similarities. The user information determination unit 221 may transmit the input biometric data to the dynamic update determination unit 222 when recognizing that the registered user is correct.

The dynamic update determination unit 222 may determine whether to additionally register biometric data and whether to perform update by using the biometric data by determining a correlation between biometric data input by the input unit 210 and data for dynamic update stored in the user information data storage 231.

The dynamic update determination unit 222 may determine the quality of data for dynamic update stored in the user information data storage 231 and determine whether to replace or remove the data. The dynamic update determination unit 222 may determine whether to perform dynamic update of the input biometric data by utilizing spatial information or time information. According to one example, the spatial information and the time information may be independently determined when determining whether to perform dynamic update. According to one example, the dynamic update determination unit 222 may set the priority of the input biometric data by utilizing spatial information and time information to determine whether to perform dynamic update and may perform the dynamic update by using biometric data having a high priority. According to one example, the dynamic update determination unit 222 may remove data having a low priority when a storage space is insufficient. The dynamic update determination unit 222 may individually compare biometric data with data for dynamic update or may perform the comparison at once by using accumulated information of the data for dynamic update. A method of determining the priority is described below.

In one example of the spatial information, it is possible to determine how spatially similar the spatial information of data for dynamic update is compared to the input biometric data and to determine whether to perform registration by determining a correlation between the input biometric data and the data for dynamic update. In one example of the spatial information, relative positions and angles of the data for dynamic update and the input biometric data may be considered to reduce redundant information in acquiring biometric data. According to one example, it is possible to check not only a relative position and an angle of a sensor but also pressure, humidity, and so on and to determine how different the input biometric data is from the data for dynamic update by using the correlation. Authentication accuracy of the updated biometric data may be improved through intermittent or continuous update.

In one example of the time information, it is possible to determine whether to perform registration and update by recording and referring to whether authentication is sequentially successful by using biometric data to determine whether a user continuously used the authentication device. Specific examples of the spatial information and the time information are further described with reference to FIGS. 7A to 9E. However, spatial information and time information according to the inventive concepts may not be limited to the above description.

The dynamic updater 223 may determine whether the similarity acquired by the user information determination unit 221 is within a preset (or alternatively, desired) update range and may update the data for dynamic update stored in the user information data storage 231 by using the biometric data input by the input unit 210 based on the determination that the similarity is within the preset (or alternatively, desired) update range.

Figure 4:
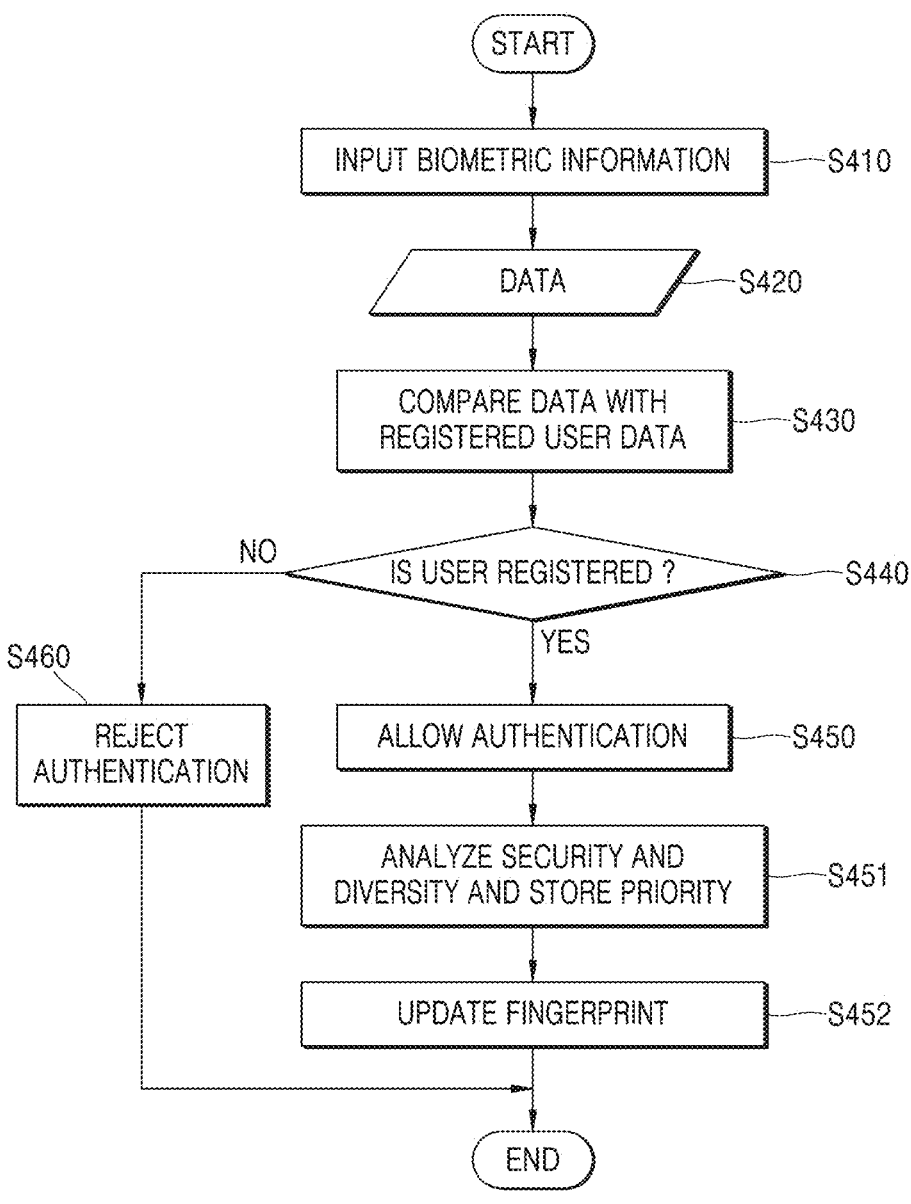
FIG. 4 is a flowchart illustrating an operating method of a dynamic update system, according to an example embodiment of the inventive concepts.

FIG. 4 is a flowchart illustrating an operating method of a dynamic update system according to an example embodiment of the inventive concepts.

The dynamic update system according to an example embodiment of the inventive concepts may receive biometric information through an input unit (S410). The input biometric information may be converted into data (S420), and a user information determination unit may compare the registered user data with the input biometric data (S430). By comparing the registered user data with the input biometric data, it may be determined whether a user of the input biometric data is a registered user (S440). In an operation of determining whether the user of the input biometric data is the registered user, it is possible to determine whether there is an overlapping area between the registered user data and the input biometric data and whether the user of the input biometric data is the registered user through similarity determination in the overlapping area.

When it is determined that the user of the input biometric data is the registered user, authentication may be allowed (S450). Allowing authentication may mean allowing payment by a payment system through the authentication. After authentication is allowed, a dynamic update determination unit 222 may determine whether to use the corresponding biometric data for update. In this case, it is possible to determine whether to store security, diversity analysis, and priority to use for update (S451). In this case, it is possible to determine the priority of biometric data by utilizing spatial information and time information and to determine whether to use the priority for update. When determining whether to perform updates by using the spatial information, dynamic update may be performed by utilizing the spatial information in the most different features considering a similarity criterion and an overlapping area. When determining whether to perform update by using the time information, dynamic update may be performed by utilizing the biometric data which is continuously successful for authentication considering sequential authentication. Stability may be increased by using time information, and efficiency may be increased by using spatial information.

When it is determined that data is used for update, a dynamic updater may dynamically update a fingerprint by using the data (S452). When it is determined that a user is not registered, authentication is rejected (S460) and the operation may end.

According to the inventive concepts, dynamic update may be performed when biometric data for payment is input. According to the inventive concepts, a registration process may be additionally performed in performing an authentication process in actual use after a user registration process is completed previously. Accordingly, it is possible to reduce the time required (or alternatively, used) for registration in a pre-registration process. Security is enhanced by using similarity and additional information separately from the authentication performed by determining similarity with the registered user data to increase stability of the additional registration process, and at the same time, authentication performance may be improved by storing efficient information.

FIG. 5 is a flowchart illustrating an operating method of a dynamic update system, according to an example embodiment of the inventive concepts. Descriptions that are substantially the same as the descriptions made with reference to FIG. 4 are omitted. Operation S510 to operation S560 of FIG. 5 may respectively correspond to operation S410 to operation S460 of FIG. 4.

After authentication is allowed, whether to use the corresponding data for update may be determined. whether to use the corresponding data for update may be determined by checking whether the corresponding data has security and diversity compared to data used for the existing registration (S551). Operation S551 of FIG. 5 may correspond to operation S451 of FIG. 4. When the corresponding data has security and diversity, that is, when the corresponding data has a high priority, whether there is room in a registration space may be determined (S552). When it is determined that there is room in the registration space, a fingerprint may be additionally registered (S553). After the fingerprint is additionally registered, the registered fingerprint may be analyzed, and priority may be reset (S554). When it is determined that there is no room in the registration space, the fingerprint may be updated (S555). When there is no room in the registration space, the fingerprint may not be stored separately and may also be used only for update. Alternatively, when it is determined that there is no room in the registration space, a previously registered fingerprint may be removed, and the fingerprint may be updated (S555). In this case, a fingerprint having a low priority may be removed.

When dynamic update is intended to be performed and when the registration space for fingerprint update is full, whether to stop dynamic update or remove the existing data to perform the dynamic update may be determined. When there is no room in the registration space, the same information may not be registered. This may be illustrated in FIG. 9D to be described below. When there is room in the registration space, even information similar to the existing information may be determined to be registered. This may be illustrated in FIG. 9B to be described below. According to one example, biometric data may change over time, and accordingly, dynamic update may also be performed at a regular period.

Figure 6:
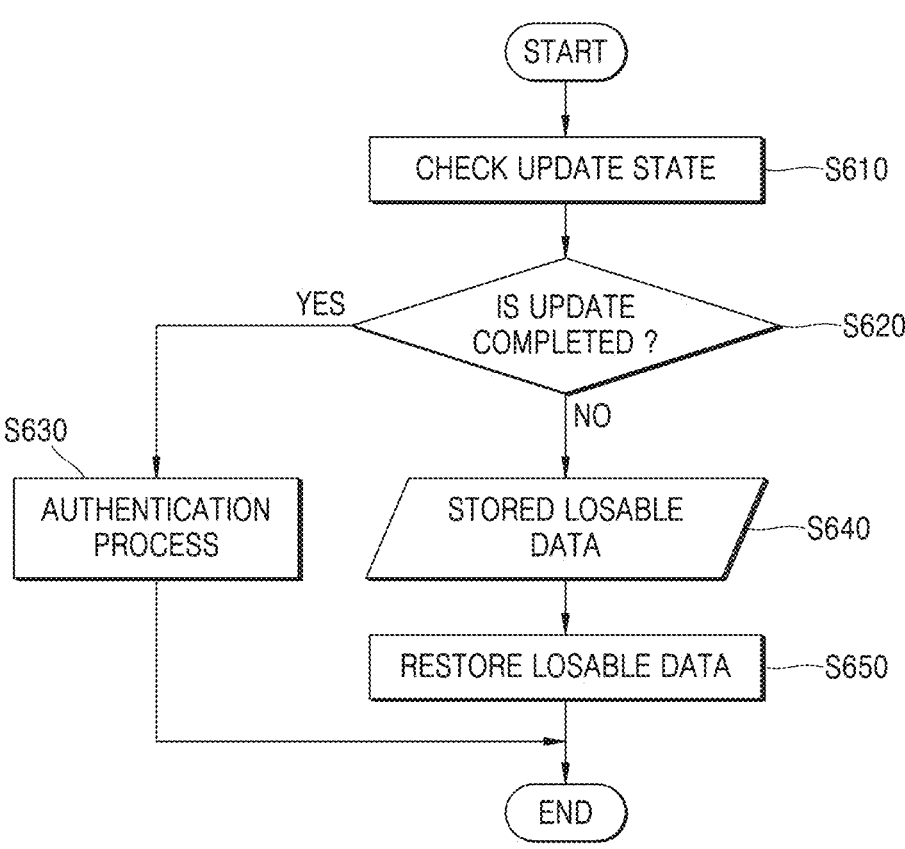
FIG. 6 is a flowchart illustrating a data restoring method of a dynamic update system, according to an example embodiment of the inventive concepts.

FIG. 6 is a flowchart illustrating a data restoring method of a dynamic update system, according to an example embodiment of the inventive concepts.

Referring to FIG. 6, while dynamic update is performed, an update state may be checked (S610). Thereafter, whether the update is completed may be checked (S620). When the update is completed, an authentication process may be performed (S630).

When the update is not completed, the stored losable data may be checked (S640). Thereafter, losable data may be restored (S650).

According to one example, an operation of backing up existing data may be further performed before update is performed. Thereafter, whether the update is completed may be checked (S620). When the update is not completed, the existing data may be restored (S650), and when the update is completed, an authentication process may be performed (S630).

According to the example of FIG. 6, the existing information may be stored in an additional memory in a case in which information is not updated due to interruption of an information updating process or the existing information is removed, and when the update is not completed, the existing information may be restored by using a process for checking an update state.

Figures 7C, 8:
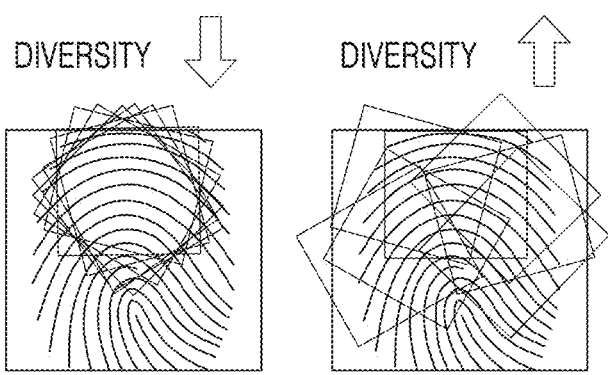

FIGS. 7A to 7C are views illustrating dynamic update in which spatial information is considered, according to some example embodiments of the inventive concepts.

Left views of FIGS. 7A and 7B are examples of a user's fingerprint. Referring to FIG. 7A, the user's fingerprint of FIG. 7A may be divided into a region A on an upper side and a region B on a lower side. Referring to FIG. 7B, the user's fingerprint of FIG. 7B may be divided into a region A' similar to the region A on the upper side and a region B on a lower side. Right views of FIGS. 7A and 7B may be a plurality of examples of fingerprints for payment which are input by a user. Referring to the right views of FIG. 7A, most of the user's fingerprints correspond to the region A. Referring to the left views of FIG. 7B, the user's fingerprints correspond to the region A'.

Referring to the example of FIG. 7A, in a case in which only the user's fingerprint corresponding to the same region is input, when a fingerprint of a region other than the region A, that is, a fingerprint of a region spatially arranged in a different position (for example, the region B) is input, priority of the corresponding fingerprint may be high, and accordingly, dynamic update may be performed. According to an example, spatial similarity between the region A and the region B may be low.

Referring to the example of FIG. 7B, even in a case in which fingerprints of not only one same region but also various regions sharing the corresponding region are input, when a fingerprint of a region other than the region A', that is, a fingerprint of a region (for example, the region B) spatially arranged in a different position is input, priority of the corresponding fingerprint may be high, and accordingly, dynamic update may be performed. According to one example, spatial similarity between the region A' and the region B may be low but may be higher than the spatial similarity between the region A and the region B.

The left view of FIG. 7C illustrates an input fingerprint when there is no diversity, and the right view of FIG. 7C illustrates an input fingerprint when there is diversity. According to one example, when dynamic update is performed by using spatial information, spatial relative information may be checked to perform the dynamic update and to remove some of the registered user data. As illustrated in the left of FIG. 7C, an input fingerprint without diversity may be dynamically updated by setting a high priority to data that does not have a high spatial similarity with the registered user data, and overlapping data may be first removed from the registered user data. As illustrated in the right diagram of FIG. 7C, the input fingerprint having diversity may be used for dynamic update, even when the input fingerprint corresponds to data somewhat similar to the existing data.

The dynamic update processing unit 220 according to the inventive concepts may check spatial relative information as well as similarity to determine a degree of overlap, thereby using the same for updating and removing data. That is, in the limited storage capacity, dynamic update data having a high degree of overlap may be removed and replaced. In addition, among the input biometric data, only biometric data having a low degree of overlap may be used for update.

FIG. 8 is a diagram illustrating dynamic update in which time information is considered, according to an example embodiment of the inventive concepts.

Referring to FIG. 8, the table illustrates an example in which biometric data is sequentially input. FIG. 8 illustrates whether authentication is successful when biometric data is input. Authentication is successful the first time and the second time but fails the third time. Thereafter, authentication is successful the fourth time but fails again the fifth time. Thereafter, authentication is continuously successful the sixth time to the $14^{th}$ time. In this way, when biometric data is input, update may be allowed only when authentication is continuously successful n times. In this case, n may be a natural number of 3 or more and may be a preset (or alternatively, desired) value. Biometric data that is continuously authenticated may have a high priority. According to an example, when authentication is continuously successful n times while a temporal dynamic update is performed, it is determined that a card is not stolen and dynamic update may be performed by using any one piece of data that is continuously successful n times in authentication, and in this case, when the storage space is full, older data may be sequentially removed. According to one example, when authentication fails while authentication is continuously attempted n times, the authentication may be reset.

Data having a high priority and data having a low priority may be relative to each other depending on data for dynamic update. According to one example, when only the data in the left direction is stored as data for dynamic update, biometric data in the right direction may have a high priority, and biometric data in the left direction may have a low priority. According to one example, when only the data in the left direction is stored as data for dynamic update, biometric data in an upward direction and biometric data in a downward direction may have a higher priority as an overlap area is small and similarity is low when considering an area overlapping the data in the left direction and similarity therebetween. According to one example, data for dynamic update stored one month ago may have a lower priority than data for dynamic update stored two weeks ago. In this way, the data having a high priority and data having a low priority may be determined by comprehensively considering a relationship between spatial information, time information, data for dynamic update, and input biometric data.

FIGS. 9A to 9E are diagrams illustrating a detailed dynamic update method according to an example embodiment of the inventive concepts.

Figure 9A:
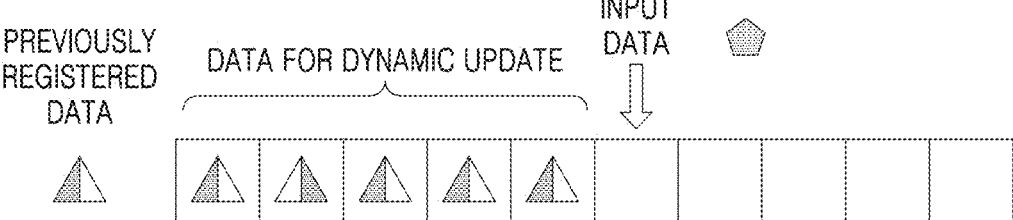
FIGS. 9A to 9E are diagrams illustrating a detailed dynamic update method according to an example embodiment of the inventive concepts.
Figure 9B:
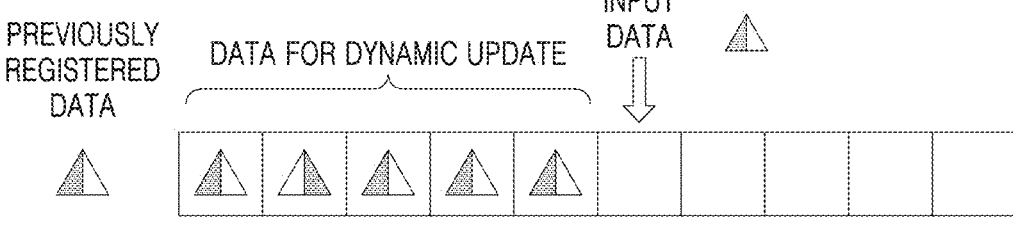
Figure 9C:
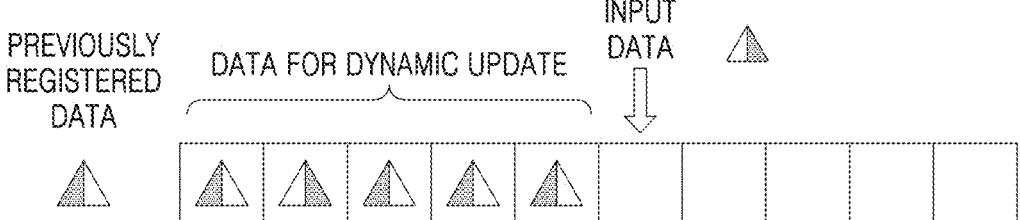
Figure 9D:
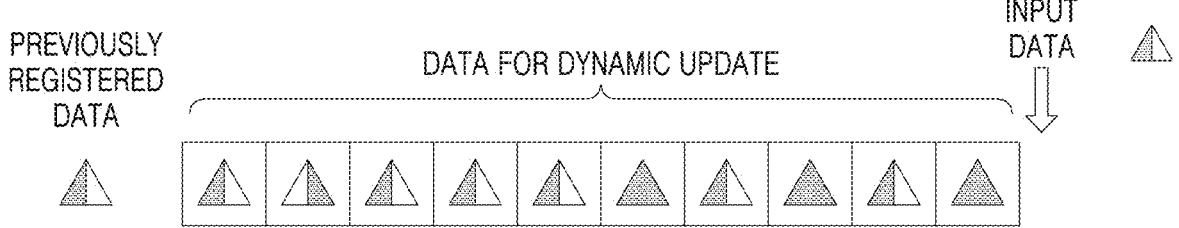
Figure 9E:
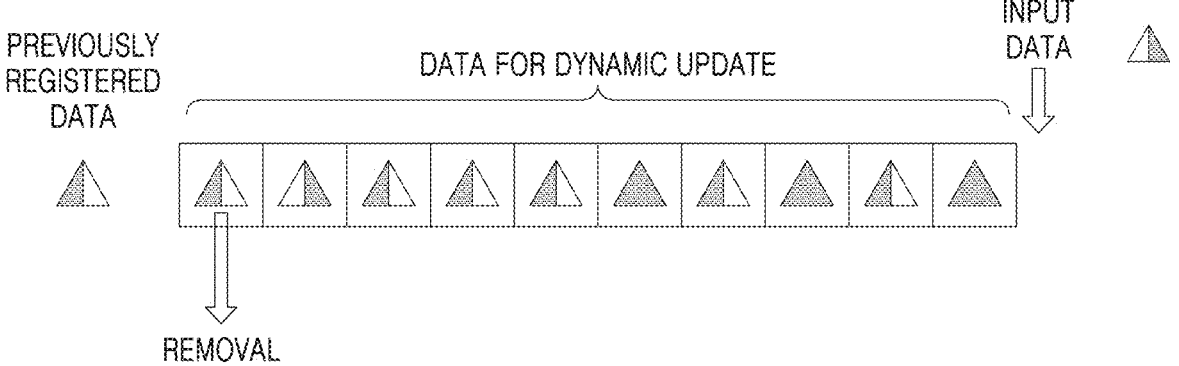

FIGS. 9A to 9C may be examples illustrating a dynamic update method when there is room in a storage space. FIGS. 9D to 9E may be examples illustrating the dynamic update method when the storage space is full. In FIGS. 9A to 9E, different users may be illustrated in different shapes. In FIGS. 9A to 9E, each diagram may be illustrated in a partially filled state or may be illustrated in a fully filled state. Different filled states of the respective diagrams may mean that the respective diagrams have different types of spatial information.

FIG. 9A illustrates a case in which new biometric data is input in a state where a storage space is 50% full. When new biometric data is input, a process of determining whether a user is correct by comparing the new biometric data with the existing registration data may be performed first. Referring to FIG. 9A, the existing registration data is illustrated in a triangular shape, but the input biometric data (input data) is illustrated in a pentagonal shape. That is, in the example embodiment of FIG. 9A, a user of the existing registration data is different from a user of the input biometric data, and accordingly, authentication may be rejected.

In the example embodiment of FIG. 9B, a case, in which biometric data lacking in diversity compared to data for dynamic update is input, is illustrated. Referring to FIG. 9B, both the input biometric data and the existing registration data have a triangular shape, and accordingly, it may be determined that the users are identical. Because the users are identical, whether to perform dynamic update may be determined. Referring to FIG. 9B, the input biometric data may be similar to or the same as most of the data for dynamic update. The input biometric data may lack diversity. In other words, in a case in which the input biometric data lacking in diversity compared to data for dynamic update is input, and when a storage space is prepared, the input biometric data may be stored as dynamic update data. Alternatively, even when the storage space is prepared, the input biometric data may not be stored as the dynamic update data.

In the example embodiment of FIG. 9C, a case, in which data having diversity compared to data for dynamic update is input, is illustrated. In FIG. 9C, descriptions that are substantially the same as the descriptions made with reference to FIG. 9B are omitted. Referring to FIG. 9C, input biometric data may have low similarity compared to data for dynamic update. The input biometric data may have diversity. When the input biometric data with diversity is input, the input biometric data may be stored as dynamic update data, and dynamic update may be performed.

In the example embodiment of FIG. 9D, a case, in which data lacking in diversity compared to data for dynamic update is input, is illustrated. In FIG. 9D, descriptions that are substantially the same as the descriptions made with reference to FIG. 9B are omitted. Referring to FIG. 9D, when data lacking in diversity is input when the storage space is full, dynamic update of corresponding data may not be performed, and the corresponding data may not be stored.

In the example embodiment of FIG. 9E, a case, in which data having diversity compared to data for dynamic update is input, is illustrated. In FIG. 9E, descriptions that are substantially the same as the descriptions made with reference to FIG. 9B are omitted. Referring to FIG. 9E, when data having diversity is input when the storage space is full, dynamic update of corresponding data may be performed, the existing data may be removed (e.g., removal), and new data having diversity may be stored in the storage space. Data having a low priority among the existing data may be removed. According to another example, duplicate data may be removed from the existing data. According to one example, when data is removed by considering spatial information, data with the highest similarity to the existing data may be removed, and when data is removed by considering time information, the oldest data may be removed.

According to the inventive concepts, in order to use the input biometric data for update, not only authentication is performed with similarity to data for dynamic update, but also spatial diversity is determined, and thus, the efficiency of the limited storage space may be increased. According to the inventive concepts, in order to determine whether to update biometric data, chronologically continuous authentication results may be stored, and based on this, it is checked whether a use is registered, and thus, security may be increased. In addition, according to the inventive concepts, it is possible to determine and replace information that is not prioritized in the previously registered information (previously registered data). In addition, when registration information is updated, backup and restoring may be performed in preparation for a power supply to be destabilized. Accordingly, stability may be increased.

Figure 10:
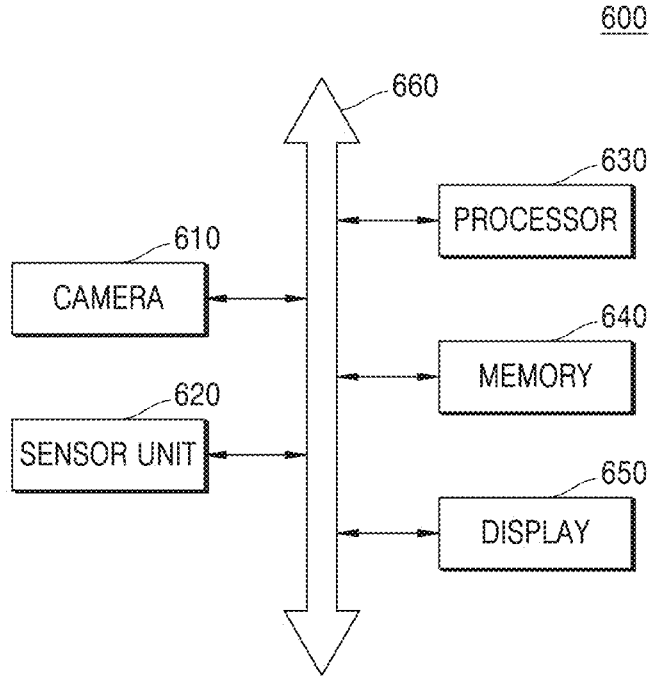
FIG. 10 is a diagram illustrating a configuration of a dynamic update system according to an example embodiment of the inventive concepts.

FIG. 10 is a diagram illustrating a configuration of a dynamic update system according to an example embodiment of the inventive concepts. Referring to FIG. 10, a dynamic update system 600 may include a camera 610, a sensor unit 620, a processor 630, a memory 640, and a display 650. The camera 610, the sensor unit 620, the processor 630, the memory 640, and the display 650 may communicate with each other through a bus 660.

The camera 610 may acquire biometric data including a user's face information. The sensor unit 620 may include one or a plurality of sensors that may acquire biometric data, such as fingerprint sensors, facial recognition sensors, retina sensors, etc.

The processor 630 may perform one or more operations described above with reference to FIGS. 4 to 6. For example, the processor 630 may receive a plurality of pieces of biometric data and perform user authentication and dynamic update based on the biometric data and registered user data. The processor 630 may be implemented by an array of multiple logical gates and may be implemented by a combination of a universal microprocessor and the memory 640 storing a program that may be executed by the universal microprocessor. In addition, those skilled in the art to which the inventive concepts belong will understand that the processor 630 may also be implemented by a different type of hardware. The processor 630 or other processing circuitry may perform the operations of the input unit 210 and the dynamic update processing unit 220 including the user information determination unit 221, the dynamic update determination unit 222, and the dynamic updater 223.

The memory 640 may store instructions, parameters, and data used in the process of authentication or store data and results acquired by operating the dynamic update system 600. The display 650 may output the results acquired by an operation of the processor 630. For example, the display 650 may output a description of requests a certain operation from a user to acquire biometric data from the user or output a certification result. The memory 640 may include, buffers, volatile memory, and non-volatile memory and may perform the functions of the storage 230 including the user information data storage 231, and the buffer unit 232.

The example embodiments described above may be implemented by hardware components, software components, and/or a combination of the hardware components and the software components. For example, the devices, the methods, and the components described in the example embodiments may be implemented by using one or more universal computers or special-purpose computers, such as a processor, a controller, an arithmetic logic unit (ALU), a digital signal processor, a microcomputer, a field programmable gate array (FPGA), a programmable logic unit (PLU), a microprocessor, or any other device that may execute instructions and respond thereto. A processing device may execute an OS and one or more software applications of the OS. In addition, the processing device may also access, store, operate, process, and generate data according to execution of the software. For the sake of convenience of understanding, the processing device may be a single device, but those skilled in the art will understand that the processing device may include a plurality of processing elements and/or a plurality of types of processing elements. For example, the processing device may include a plurality of processors or one processor and one controller. In addition, the processing device may have another processing configuration, such as parallel processors.

The software may include a computer program, codes, instructions, or one or more combinations thereof and may configure the processing device to operate as desired or may independently or collectively command the processing device. In order to be interpreted by the processing device or to provide instructions or data to the processing device, software and/or data may be permanently or temporarily embodied by any type of machine, components, a physical device, virtual equipment, a computer storage medium or device, or signal waves to be transmitted. Software may be distributed on computer systems connected to each other by a network and may be stored or executed in a distributed manner. Software and data may be stored in one or more computer-readable recording media.

The method according to the example embodiment may be implemented in the form of a program command that may be performed by various computer devices and may be recorded in a computer-readable recording medium. The computer-readable recording medium may include program commands, data files, and data structures alone or in combination. The program commands recorded in the computer-readable recording medium may be specially designed and configured for some example embodiments or may be known and used to those skilled in computer software. For example, the computer-readable recording medium may include a magnetic medium, such as a hard disk, a floppy disk, or magnetic tape, an optical medium, such as a compact disk read-only memory (CD-ROM) or a digital video disk (DVD), a magneto-optical medium, such as a floptical disk, and a hardware device specially configured to store and execute program commands, such as ROM, random access memory (RAM), and flash memory. For example, the program commands may include machine code that is generated by a compiler and high-level language code that may be executed by a computer using an interpreter. The hardware device described above may be configured to operate as one or more software modules to perform operations of the example embodiment, and vice versa.

Any of the elements and/or functional blocks disclosed above may include or be implemented in processing circuitry such as hardware including logic circuits; a hardware/software combination such as a processor executing software; or a combination thereof. For example, the communication unit 11, input unit 210, dynamic update processing unit 220, user information determination unit 221, dynamic update determination unit 222, and dynamic updater 223 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the inventive concepts has been particularly shown and described with reference to some example embodiments thereof, it will be understood that various changes in form and details may be made therein without departing from the spirit and scope of the following claims.

What is claimed is:
1. A dynamic update system comprising:
a storage; and
processing circuitry configured to

14 receive biometric information of a user in real time and convert the biometric information into biometric data, and use the biometric data for a dynamic update, and back up registered biometric data of the user and data for the dynamic update in the storage, wherein the processing circuitry is further configured to determine whether to perform the dynamic update using the biometric data by utilizing spatial information and time information of the biometric data relative to previously registered data, and the spatial information is based on a first amount of overlap amongst the previously registered data and a second amount of overlap between the biometric data and the previously registered data such that a higher first amount of overlap is during the dynamic update, the higher priority for dynamic update for the biometric data is set.

2. The dynamic update system of claim 1, wherein the processing circuitry is further configured to:
first determine whether the biometric data matches the registered biometric data of the user; and
second determine whether to perform the dynamic update by using the biometric data based on the first determining.

3. The dynamic update system of claim 2, wherein the processing circuitry is configured to second determine whether to perform the dynamic update in response to the first determining indicating that the biometric data matches the registered biometric data of the user.

4. The dynamic update system of claim 3, wherein the processing circuitry is configured to
determine whether to perform the dynamic update using the biometric data based on at least one of the spatial information and the time information, and
set priority of the biometric data based on at least one of the spatial information and the time information.

5. The dynamic update system of claim 4, wherein the time information includes information including a number of consecutive matches of the biometric data with the registered biometric data of the user.

6. The dynamic update system of claim 5, wherein, the processing circuitry is configured to, in response to the biometric data consecutively matching the registered biometric data of the user for a certain number of times, set a priority of the biometric data to be high.

7. The dynamic update system of claim 4, wherein the processing circuitry is configured to perform dynamic update based on the biometric data having a high priority.

8. The dynamic update system of claim 7, wherein, the processing circuitry is configured to, in response to performing the dynamic update and in response to a storage space for storing the previously registered data for registration being full, remove data having a low priority from the previously registered data for registration and store data having the high priority.

9. The dynamic update system of claim 7, wherein the processing circuitry is configured to dynamically update in response to biometric data for payment being input.

10. A dynamic update method comprising:
receiving biometric information of a user and converting the biometric information into biometric data;
determining whether the biometric data matches registered user data;

determining whether to perform a dynamic update based on spatial information and time information in response to the biometric data matching the registered user data; and performing dynamic update based on a result of determining whether to perform the dynamic update, wherein the spatial information is based on a first amount of overlap amongst the registered user data and a second amount of overlap between the biometric data and the registered user data such that a higher first amount of overlap is during the dynamic update, the higher priority for dynamic update for the biometric data is set.

11. The dynamic update method of claim 10, wherein the determining whether to perform the dynamic update based on at least one of the spatial information and the time information includes, in response to the biometric data matching the registered user data, setting priority by comparing the biometric data with previously stored data for registration.

12. The dynamic update method of claim 11, wherein a priority is determined based on at least one of spatial similarity between the biometric data and the previously stored data for registration and a number of consecutive matches of the biometric data with the registered user data.

13. The dynamic update method of claim 12, wherein a lower a spatial similarity is, a higher a priority of the biometric data is set, and a greater the number of consecutive matches is, the higher the priority of the biometric data is set.

14. The dynamic update method of claim 11, wherein the determining whether to perform the dynamic update based on at least one of the spatial information and the time information includes, in response to the biometric data matching the registered user data, performing the dynamic update by using the biometric data set to have a high priority.

15. The dynamic update method of claim 14, further comprising:

in response to a storage space of data necessary for the dynamic update being full after the dynamic update is performed, removing data having a low priority.

16. A dynamic update system comprising:

a storage; and processing circuitry configured to receive biometric information of a user in real time and convert the biometric information into biometric data;

use the biometric data for dynamic updating; and back up stored data for the dynamic updating in the storage, wherein the processing circuitry is further configured to determine whether to perform using the biometric data for the dynamic updating based on spatial information and time information, and perform dynamic updating, wherein the storage is configured to temporarily store the biometric data as temporarily stored biometric data used for the dynamic updating, and wherein the spatial information is based on a first amount of spatial overlap amongst previously registered data and a second amount of overlap between the biometric data and the previously registered data such that a higher first amount of overlap is during the dynamic update, the higher priority for dynamic update for the biometric data is set.

17. The dynamic update system of claim 16, wherein the processing circuitry is configured to remove the temporarily stored biometric data from the storage when the dynamic updating is completed.

18. The dynamic update system of claim 16, wherein the processing circuitry is configured to restore the temporarily stored biometric data and transmit the temporarily stored biometric data to a dynamic update processing unit in response to the dynamic update not being completed.

* * * * *